(12) United States Patent
Kautzky et al.

(10) Patent No.: US 6,989,963 B2
(45) Date of Patent: Jan. 24, 2006

(54) WRITER CORE STRUCTURES HAVING IMPROVED THERMAL DISSIPATION PROPERTIES

(75) Inventors: Michael Christopher Kautzky, Eagan, MN (US); Mallika Kamarajugadda, Edina, MN (US); Song Sheng Xue, Eden Praire, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 132 days.

(21) Appl. No.: 10/421,538

(22) Filed: Apr. 23, 2003

(65) Prior Publication Data

US 2004/0051996 A1 Mar. 18, 2004

Related U.S. Application Data

(60) Provisional application No. 60/410,614, filed on Sep. 13, 2002.

(51) Int. Cl.
*G11B 5/147* (2006.01)
(52) U.S. Cl. .................................... 360/126
(58) Field of Classification Search ................ 360/126
See application file for complete search history.

(56) References Cited

U.S. PATENT DOCUMENTS

| | | | |
|---|---|---|---|
| 4,860,140 A | 8/1989 | Momata et al. | 360/127 |
| 5,452,164 A | 9/1995 | Cole et al. | 360/113 |
| 5,640,753 A | 6/1997 | Schultz et al. | 29/603.08 |
| 5,663,856 A | 9/1997 | Packard | 360/122 |
| 5,710,683 A | 1/1998 | Sundaram | 360/126 |
| 5,949,627 A | 9/1999 | Williams et al. | 360/126 |
| 6,043,959 A | 3/2000 | Crue et al. | 360/113 |
| 6,074,566 A | 6/2000 | Hsiao et al. | 216/2 |
| 6,151,194 A | 11/2000 | Steinbrecher | 360/126 |
| 6,181,514 B1 | 1/2001 | Santini et al. | |
| 6,191,916 B1 | 2/2001 | Sasaki | 360/126 |
| 6,338,939 B1 | 1/2002 | Clarke et al. | |
| 6,349,014 B1 | 2/2002 | Crue, Jr. et al. | |
| 6,366,428 B1 | 4/2002 | Yamanaka et al. | 360/126 |
| 6,396,660 B1 | 5/2002 | Jensen et al. | |
| 6,441,994 B1 | 8/2002 | Wang et al. | 360/123 |
| 6,452,742 B1 | 9/2002 | Crue et al. | 360/126 |
| 6,466,401 B1 | 10/2002 | Hong et al. | 360/123 |
| 6,687,083 B2 * | 2/2004 | Hsiao et al. | 360/126 |
| 2002/0030928 A1 | 3/2002 | Hsiao et al. | |
| 2002/0067571 A1 | 6/2002 | Yoshida et al. | |
| 2004/0027717 A1 * | 2/2004 | Alfoqaha et al. | 360/126 |

OTHER PUBLICATIONS

U.S. Appl. No. 09/649,985, filed on Aug. 29, 2000, Shukh et al.

(Continued)

*Primary Examiner*—A. J. Heinz
(74) *Attorney, Agent, or Firm*—Kinney & Lange, P.A.

(57) ABSTRACT

A data transducer is used for writing data to a disc and has an air bearing surface. The data transducer also includes a bottom pole and a top pole separated from the bottom pole at the air bearing surface by a write gap. A core is formed between the bottom pole and the top pole and a conductive coil is positioned within the core. The data transducer further includes an insulator conformed to turns of the conductive coil and a core fill deposited within the entire core wherein the core fill is a high-thermal conductivity material. The insulator and core fill dissipate thermal energy away from the conductive coil.

17 Claims, 5 Drawing Sheets

OTHER PUBLICATIONS

U.S. Appl. No. 10/271,954, filed on Oct. 15, 2002, Shukh et al.

U.S. Appl. No. 10/352,744, filed on Jan. 28, 2003, Zou et al.

R.M Bozorth, Ferromagnetism, *IEEE Press*.

H. Masumoto, 'On the Thermal Expansion of the Alloys of Iron, Nickel, and cobalt and the Cause of the Small Expansibility of Alloys of the Invar Type', *Science Reports of the Tohoku Imperial University*, vol. XX, 1931.

\* cited by examiner

WRITER CORE STRUCTURES HAVING IMPROVED THERMAL DISSIPATION PROPERTIES

CROSS-REFERENCE TO RELATED APPLICATION(S)

This application claims priority from provisional application No. 60/410,614 filed Sep. 13, 2002, for "WRITER CORE STRUCTURES HAVING IMPROVED THERMAL DISSIPATION PROPERTIES" by Michael Christopher Kautzky, Mallika Kamarajugadda and Song Sheng Xue.

BACKGROUND OF THE INVENTION

The present invention relates generally to the field of magnetic data storage and retrieval systems. In particular, the present invention relates to a method for fabricating a thin film transducing head having improved thermal dissipation properties.

In a magnetic data storage and retrieval system, a thin film transducing head generally includes a transducer, a substrate upon which the transducer is built, and an overcoat deposited over the transducer. The transducer typically includes a writer portion for storing magnetically-encoded information on a magnetic media and a reader portion for retrieving the magnetically-encoded information from the magnetic media. The reader portion typically consists of a bottom shield, a top shield, and a giant magnetoresistive (GMR) sensor positioned between the bottom and top shields.

The writer portion typically consists of a top and a bottom pole, which are separated from each other at an air bearing surface of the writer by a gap layer, and which are connected to each other at a region distal from the air bearing surface by a back gap closer or back via. Positioned between the top and bottom poles are one or more layers of conductive coils encapsulated by insulating layers, or a writer core. The writer portion and the reader portion are often arranged in a merged configuration in which a shared pole serves as both the top shield in the reader portion and the bottom pole in the writer portion.

To write data to the magnetic media, an electrical current is caused to flow through the conductive coils to thereby induce a magnetic field across the write gap between the top and bottom poles. By reversing the polarity of the current through the coils, the polarity of the data written to the magnetic media is also reversed. Because the top pole is generally the trailing pole of the top and bottom poles, the top pole is used to physically write the data to the magnetic media. Accordingly, it is the top pole that defines the track width of the written data. More specifically, the track width is defined by the width of the top pole at the air bearing surface.

During operation of the magnetic data storage and retrieval system, the transducing head is positioned in close proximity to the magnetic media. The distance between the transducer and the media is preferably small enough to allow for writing to and reading from the magnetic media with a large areal density, and great enough to prevent contact between the magnetic media and the transducing head. Performance of the transducer depends primarily upon head-media spacing (HMS). Pole-tip recession/protrusion (PTR) at the air bearing surface is considered to be a primary technical gap for hitting required HMS targets. During high drive ambient temperatures, PTR increases the risk of head-disc contact and the attendant mechanical reliability problems, while during cold write it can increase the HMS to the point of degrading writeablity, signal-to-noise ratio, and bit error rate. Control of the overall PTR performance is critical in magnetic head designs.

The layers of the transducer, which include both metallic and insulating layers, all have different mechanical and chemical properties than the substrate. The differences in properties affect several aspects of the transducer, including pole-tip recession (PTR) of the metallic layers of the transducer with respect to the substrate at an air bearing surface (ABS) of the transducing head. Two components of the PTR effect exist, thermal pole tip recession/protrusion (TPTR) and current-induced recession/protrusion (CPTR). TPTR arises from isothermal (global) temperature changes in the transducing head during drive operation. TPTR is proportional to the difference in coefficients of thermal expansion ($\Delta$CTE) between the transducing head and substrate materials. Many novel proposals have been made to reduce the TPTR magnitude using low CTE materials, reduced metal material volumes, and compensation schemes.

CPTR results from localized joule heating during application of currents to the writer coil and the resultant heat dissipation into the surrounding components of the transducing head. CPTR, in contrast to TPTR, is proportional to first order to the $\Delta T$(CTE) product, where $\Delta T$ is the localized temperature rise in the writer core and CTE is that of the core fill material. At large write currents in the writer coil, $\Delta T$ can be more than 20° C., causing CPTR to exceed 0.3 $\mu$m, which is a large fraction of the total fly height budget. In the drive, heat transfer to the disc will reduce this value by 3–5 times, but it will still be a large portion of the total fly height budget. This drives constraints on write current, which conflict with performance requirements, thus, reducing CPTR must be pursued in parallel with TPTR reduction.

In principle, CPTR can be reduced by improving thermal conduction away from the coil and the surrounding core structure so that the localized temperature rise is diminished. Current writer designs use a combination of baked photoresist and sputtered $Al_2O_3$ as core fill materials, both of which have small thermal conductivities. Replacing these materials with other, high-thermal conductivity materials is a theoretically straightforward way to optimize the core for thermal dissipation. However, this is difficult due to a processing requirement of filling the coil structure, which near the ABS has up to 3:1 aspect ratio trenches between the coil turns. Future designs with similar core lengths for efficiency and a larger number of turns for higher magnetomotive force (MMF) may increase the aspect ratio as well. Thus, a need exists for a writer core structure with improved thermal dissipation that is feasible to fabricate.

BRIEF SUMMARY OF THE INVENTION

The present invention relates to a data transducer for writing data to a disc. The data transducer, which has an air bearing surface, includes a bottom pole and a top pole separated from the bottom pole at the air bearing surface by a write gap. A core is formed between the bottom pole and the top pole, and a conductive coil is positioned within the core. The data transducer further includes means for dissipating thermal energy away from the coil. The means may be comprised of an insulator conformed to turns of the conductive coil and a core fill of a high-thermal conductivity material deposited within the core.

DETAILED DESCRIPTION

Figure 1:
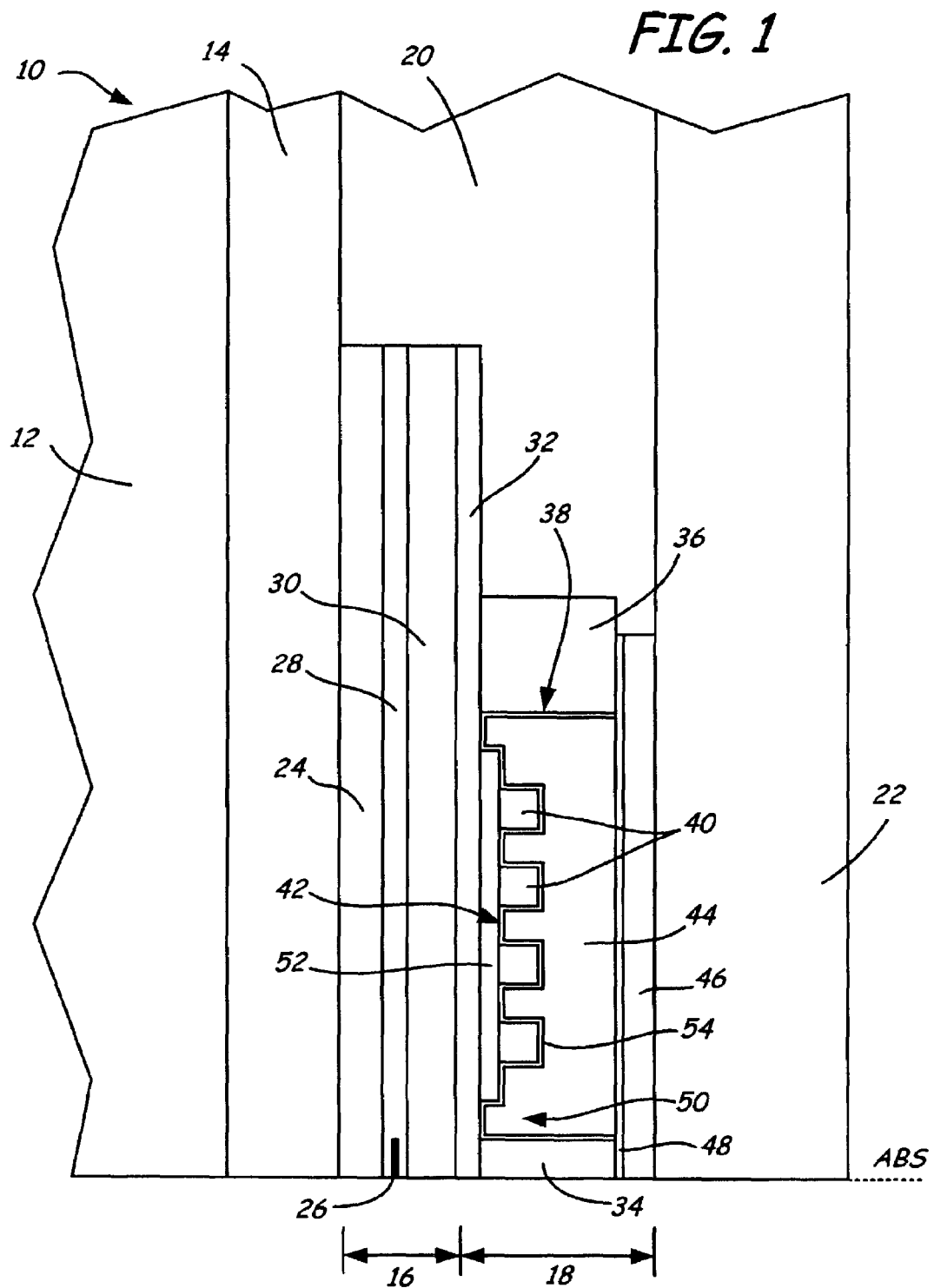
FIG. 1 is a partial cross-sectional view of a transducing head in accord with the present invention.

FIG. 1 is a partial cross-sectional view of a transducing head 10 in accord with the present invention. The cross-section of FIG. 1 is taken substantially normal to an air bearing surface (ABS) of transducing head 10. Transducing head 10 includes a substrate 12, a basecoat 14, a reader 16, a writer 18, an insulating layer 20 and an overcoat 22. Reader 16 includes a bottom shield 24, a read element 26, a read gap 28, and a top shield 30. Writer 18 includes a bottom pole 32, a shared pole extension 34, a back via 36, a writer core structure 38 (which includes a conductive coil 40, an insulator 42, and a core fill 44), a top pole 46, and a write gap 48. A shared pole is formed by the combination of top shield 30, bottom pole 32 and a spacer (not shown). Shared pole extension 34 and back via 36 are also collectively identified as an upper shared pole.

Basecoat 14 is deposited on substrate 12. Reader 16 and writer 18 are each multi-layered devices, which are stacked upon basecoat 14 adjacent the ABS of transducing head 10. As shown in FIG. 1, reader 16 is formed on basecoat 14, and writer 18 is stacked on reader 16 in a piggyback configuration (in which layers are not shared between the two elements). In other embodiments not illustrated, reader 16 and writer 18 may be arranged in a merged-head configuration (in which layers are shared between the two elements), and/or writer 18 may be formed on basecoat 14 (with reader 16 being formed on writer 18). Co-planarly positioned with the layers of reader 16 and writer 18, and opposite the ABS of transducing head 10, is insulating layer 20. Overcoat 22 is formed upon writer 18.

Substrate 12 is typically formed of AlTiC, TiC, Si, SiC, $Al_2O_3$, or other composite materials formed of combinations of these materials. Of these materials, AlTiC and TiC have relatively large coefficients of thermal expansion (CTE), typically in the range of about $6.0 \times 10^{-6}/°$ C. to about $9.0 \times 10^{-6}/°$ C., while silicon has a lower CTE, in the range of about $2.0 \times 10^{-6}/°$ C. to about $3.0 \times 10^{-6}/°$ C.

Basecoat 14 is formed on substrate 12 in transducing head 10 shown in FIG. 1, although other embodiments may have basecoat 14 formed in an alternative location. Basecoat 14 is generally formed of an insulating material, such as $Al_2O_3$, AlN, $SiO_2$, $Si_3N_4$, or $SiO_{0-2}NO_{0-1.5}$. Generally the insulating material for basecoat 14 is selected to most closely match the chemical and mechanical properties of the material used as the substrate. For example, an $Al_2O_3$ basecoat is commonly used in conjunction with an AlTiC substrate, since the two materials have similar CTEs.

Reader 16 is formed on basecoat 14, and includes bottom shield 24, read element 26, read gap 28, and top shield 30. Read gap 28 is defined on the ABS between terminating ends of bottom shield 24 and top shield 30. Read element 26 is positioned in read gap 28 adjacent the ABS. Read gap 28 insulates read element 26 from bottom shield 24 and top shield 30. Read element 26 may be any variety of different types of read elements, such as an anisotropic magnetoresistive (AMR) read element, a giant magnetoresistive (GMR) read element, or a tunneling giant magnetoresistive (TGMR) read element.

Writer 18 is formed on reader 16, and includes bottom pole 32, shared pole extension 34, back via 36, writer core structure 38, and top pole 46. Writer core structure 38 includes conductive coil 40, insulator 42, and core fill 44. Shared pole extension 34 and back via 36 are formed on bottom pole 32, with shared pole extension 34 being positioned adjacent the ABS and back via 36 being spaced away from the ABS. Write gap 48 is defined on the ABS between shared pole extension 34 and top pole 46. Top pole 46 is formed over shared pole extension 34 and extends from the ABS to back via 36. Bottom pole 32 and top pole 46 define a core 50 where conductive coil 40 is positioned. Conductive coil 40 wraps around back via 36, such that the flow of electrical current through conductive coil 40 generates a magnetic field across write gap 48. Other embodiments of writer 22 do not use shared pole extension 34, but rather use a two-piece top pole structure instead.

As shown in FIG. 1, insulator 42 encapsulates coil 40 and includes a bottom insulator 52, or first insulator, and an insulating layer 54. Bottom insulator 52 is formed upon bottom pole 32 and conductive coil 40 is formed upon bottom insulator 52. The remaining sides of conductive coil 40 are encapsulated by insulating layer 54. Conductive coil 40 is encapsulated by a thin layer of insulator 42 and the remainder of the core is filled with core fill material 44. Although FIG. 1 illustrates the present invention with respect to a longitudinal writer, further embodiments of the present invention may include a perpendicular writer. Some perpendicular writer designs do not include a shared pole extension 34, thus, core fill material 44 would be exposed at the ABS.

Each of bottom shield 24, top shield 30, bottom pole 32, shared pole extension 34, back via 36, and top pole 46 are formed of metallic materials. Preferably, each of these components is formed of an alloy primarily composed of iron (Fe), nickel (Ni), and/or cobalt (Co). Such metallic alloys typically have large CTE's. For example, Permalloy, a composition with about 80% Ni-20% Fe or 79% Ni-21% Fe, has a CTE in the range of about $10.0 \times 10^{-6}/°$ C. to $13.0 \times 10^{-6}/°$ C. Read gap 28 is generally formed of an insulating material such as $Al_2O_3$.

The writer core structure 38 includes conductive coil 40, insulator 42, and core fill 44. The writer core structure 38 is formed in core 50, which is defined by bottom pole 32, shared pole extension 34, back via 36, and top pole 46. Conductive coil 40, or the writer coil, is generally formed of an electrically-conductive metal such as copper (Cu), gold (Au), or silver (Ag). Most commonly used is copper, which has a CTE in the range of about $16.0 \times 10^{-6}/°$ C. to $18.0 \times 10^{-6}/°$ C.

Insulator 42 is deposited about conductive coil 40 to isolate coil 40 from core fill 44. Insulator 42 is formed from a thin layer of insulating material, preferably a dielectric material, such as $Al_2O_3$, $Ta_2O_5$, $HfO_2$, $TiO_2$, $ZrO_2$, CuO, $Nb_2O_5$, $SiO_2$, $In_2O_3$, MgO, TiN, TaN, MoN, NbN, SiN, AiN, WN, $W_2N$, or BN. Insulator 42 forms a thin layer of insulation which fully conforms to coil 40. Atomic layer deposition (ALD) is the preferred method for depositing insulator 42 about conductive coil 40, although other available methods include chemical vapor deposition (CVD), metal-organic CVD (MOCVD), collimated physical vapor deposition (collimated-PVD), or ionized physical vapor deposition (ionized-PVD). The previously listed materials are ideally used with ALD, which enables reduction in the thickness of insulator 42 while maintaining excellent step coverage.

Core fill 44 surrounds insulator 42 encapsulating conductive coil 40 to fill the remainder of core 50. Core fill material 44 has a high-thermal conductivity and can be insulating, semiconducting, or conducting (i.e. metallic). Examples of core fill material 44 include SiC, AlN, Poly-Si, W, and Mo. Core fill material 44 has a thermal conductivity greater than 1.5W/m-K and a coefficient of thermal expansion less than $6.0 \times 10^{-6}/°$ C.

Not shown in FIG. 1 are electrical leads and contacts to read element 26 and coil 40. The electrical leads and contacts are typically formed of metals, such as copper (Cu), tantalum (Ta), gold (Au), or other metallic elements and alloys.

Insulating layer 20 is positioned in-plane with layers of reader 16 and writer 18 of transducing head 10, opposite the ABS. Insulating layer 20 is preferably formed of an insulating material, such as aluminum oxides, aluminum nitrides, silicon oxides, silicon nitrides, and silicon oxide nitrides.

Overcoat 22 is generally formed over writer 18. Overcoat 22 is typically formed of an insulating material, such as $Al_2O_3$, AlN, $SiO_2$, $Si_3N_4$, and $SiO_{0-2}NO_{0-1.5}$, oftentimes the same material that forms basecoat 14.

The layers of transducing head 10, which include both metallic and insulating layers, all have differing mechanical and chemical properties. The differences in properties affect several aspects of the transducer, including pole-tip recession (PTR) of the metallic layers of the transducer with respect to the substrate at an air bearing surface (ABS) of the transducing head. Two components of the PTR effect exist, thermal pole tip recession/protrusion (TPTR) and current-induced recession/protrusion (CPTR). TPTR arises from isothermal (global) temperature changes in the transducing head during drive operation. TPTR is proportional to the difference in coefficients of thermal expansion (ΔCTE) between the transducing head and substrate materials. Many novel proposals have been made to reduce the TPTR magnitude using low CTE materials, reduced metal material volumes, and compensation schemes.

CPTR results from localized joule heating during application of currents to the writer coil and the resultant heat dissipation into the surrounding components of the transducing head. CPTR, in contrast to TPTR, is proportional to first order to the ΔT(CTE) product, where ΔT is the localized temperature rise in the writer core and CTE is that of the core fill material. At large write currents in the writer coil, ΔT can be more than 20° C., causing CPTR to exceed 0.3 µm, which is a large fraction of the total fly height budget. In the drive, heat transfer to the disc will reduce this value by 3–5 times, but it will still be a large portion of the total fly height budget. This drives constraints on write current, which conflict with performance requirements, thus, reducing CPTR must be pursued in parallel with TPTR reduction.

The present invention addresses the problem of CPTR with a writer core structure having improved thermal dissipation. The improved writer core structure is created by combining ALD of dielectric insulator 42 with a core fill comprised of a high-thermal conductivity material. The creation of the thermally dissipative writer core structure by combining the ALD of insulator 42 with the high-thermal conductivity of the core fill decouples the isolation and thermal conductivity requirements of materials around conductive coil 40 and allows for separate optimization of those requirements.

Generally in current writer core structures, conductive coil 40 is positioned in the core between bottom pole 32 and top pole 46 and the remainder of the core is filled with an insulating material, typically formed of baked photoresist or sputtered $Al_2O_3$ or a combination of the two. Both of these materials have a small thermal conductivity which does not optimize thermal dissipation in the core structure because the photoresist and $Al_2O_3$ are amorphous. The core fill does not have good thermal conductivity, which thereby increases the CPTR in the transducing head because current induced heat is not dissipated from the core structure.

The present invention replaces the low-thermal conductivity material in the core structure with a high-thermal conductivity material that enables and improves thermal dissipation of thermal energy from writer core structure 38 and reduces CPTR of the transducing head. Reduction of CPTR and improved thermal dissipation is enabled by encapsulating conductive coil 40 with the thin film insulator 42 and filling the remainder of core 50 with the high-thermal conductivity core fill material 44. Utilizing high-thermal conductivity core fill material 44 reduces CPTR, which is a function of ΔT and CTE, in particular the present invention reduces the ΔT of the core fill material to thereby reduce CPTR.

Figure 2:
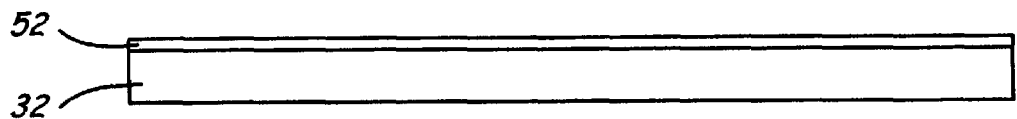
FIGS. 2 through 8 are sectional views of the transducing head illustrating various stages of one embodiment of a process flow for fabricating a writer core structure.

FIGS. 2–8 are sectional views of transducing head 10 illustrating various stages of one embodiment of a process flow for fabricating writer core structure 38. In particular, the embodiment shown in FIGS. 2–8 is a process flow for building writer 18 with standard coils. As shown in FIG. 2, bottom insulator 52, or a first insulator, is deposited on bottom pole 32. Bottom insulator 52 isolates the bottom of conductive coil 40 once it is formed. Bottom insulator 52 has a thickness of about 0.3 microns and is formed of $Al_2O_3$. Bottom insulator 52 is preferably deposited using an ALD process to enable thickness reduction of the insulator due to the higher dielectric reliability of ALD materials. Materials used to form bottom insulator 52 deposited by ALD include, $Ta_2O_5$, $HfO_2$, $TiO_2$, $ZrO_2$, CuO, $Nb_2O_5$, $SiO_2$, $In_2O_3$, MgO, TiN, TaN, MoN, NbN, SiN, AlN, WN, $W_2N$, and BN.

The thickness reduction of bottom insulator 42 enables better heat transfer to bottom pole 32, particularly because the thermal conductivity of ALD materials are 10–15% higher than PVD aluminum oxide, which is typically used. The use of ALD for insulator 42 is particularly advantageous in writer designs in which bottom pole 32 is patterned prior to deposition of bottom insulator 52 in such a way that high step coverage is required to avoid bottom pole-conductive coil shorting. One such example is perpendicular write structures in which the write pole is fabricated below the return pole. Bottom insulator 52 may also be deposited by either a CVD or ionized-PVD process, although ALD is preferred because a much thinner layer may be deposited.

Figure 3:
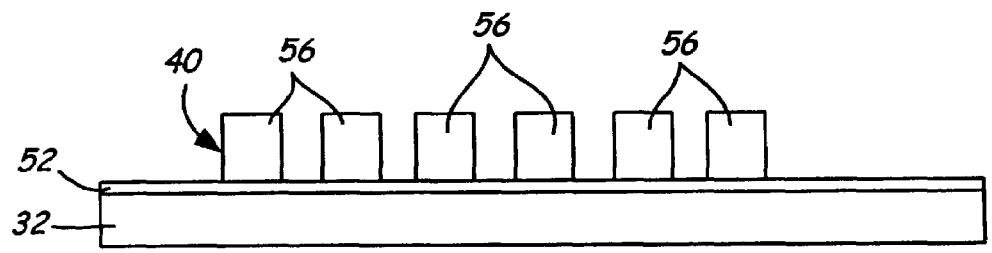

As shown in FIG. 3, conductive coil 40 is patterned upon bottom insulator 52. A plurality of coil turns 56 are shown in FIG. 3. Conductive coil 40 is patterned using standard plating and seed removal techniques, which may include ion milling or reactive ion etching.

Figure 4:
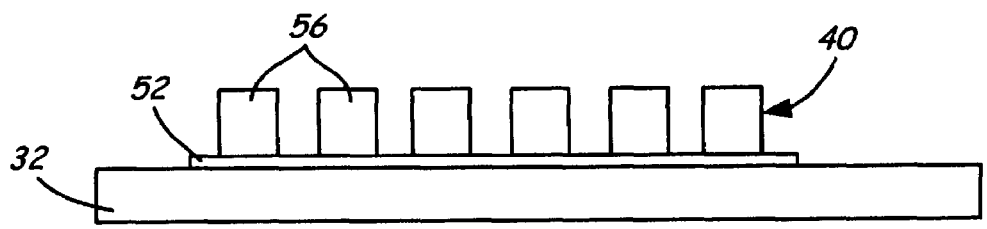

As shown in FIG. 4, bottom insulator 52 is masked and milled to expose a portion of bottom pole 32. The exposed portion of bottom pole 32 is where shared pole extension 34 and back via 36 are formed.

Figure 5:
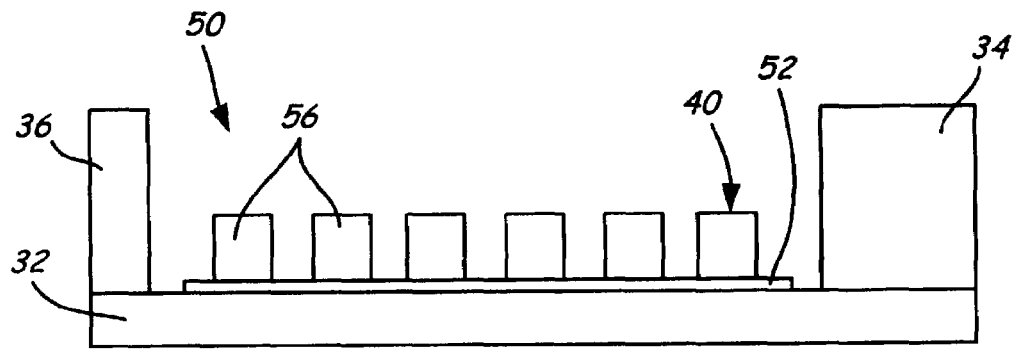

As shown in FIG. 5, shared pole extension 34 and back via 36 are plated and field etched upon bottom pole 32. Shared pole extension 34 is located adjacent the ABS and back via 36 is formed at an opposite end of bottom pole 32 from shared pole extension 34. Bottom pole 32, shared pole extension 34, and back via 36 define core 50 where the remainder of writer core structure 38 (not shown) is formed.

Figure 6:
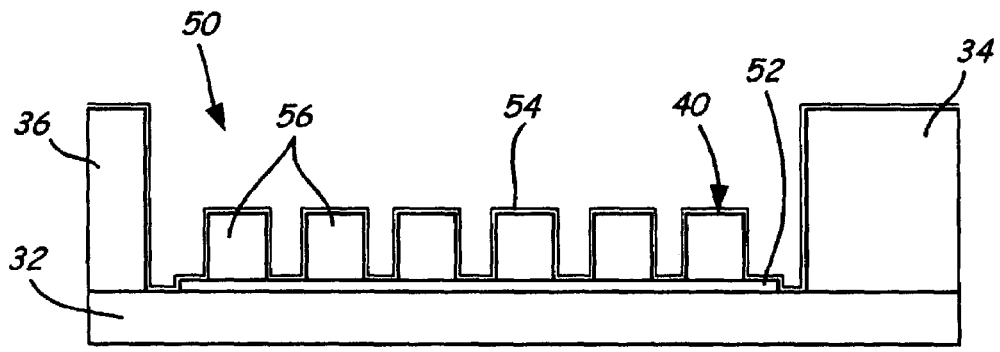

As shown in FIG. 6, insulating layer 54, or a second insulator, is deposited upon conductive coil 40 and exposed surfaces of bottom insulator 52, bottom pole 32, shared pole extension 34, and back via 36. Coil turns 56 of conductive coil 40 are isolated on the sides and top by the thin insulating layer 54. Insulating layer 54 has a thickness between about 200 angstroms and 1000 angstroms. Insulating layer 54 is as thin as possible to insure isolation to core fill material 44 while minimizing the thermal resistance between coil 40 and core fill material 44. Insulating layer 54 is deposited using the ALD technique, although other methods may be used such as CVD, MOCVD, collimated PVD, or ionized PVD. ALD is the preferred method for depositing insulating layer 54 because the process enables depositing a thin, conformal layer of material. Insulating layer 54 is formed of a material suitable for ALD processes, such as $Al_2O_3$, $Ta_2O_5$, $HfO_2$, $TiO_2$, $ZrO_2$, CuO, $Nb_2O_5$, $SiO_2$, $In_2O_3$, MgO, TiN, TaN, MoN, NbN, SiN, AlN, WN, $W_2N$, and BN. For insulating layer 54, the material with the highest thermal conductivity should be used to minimize the thermal resistance between coil 40 and core fill material 44. The ALD material selected for insulating layer 54 should not interact with copper, shared pole extension 34, back via 36, or core fill material 44. Further embodiments of the present invention may include a dedicated barrier layer on either or both sides of insulating layer 54. Materials for the barrier layer may be metal, semiconducting, or insulating and have chemical compatibility with the adjacent layers, adequate step coverage to fully separate the incompatible layers, and high thermal conductivity.

Insulating layer 54 is a dielectric material to prevent shorting of conductive coil 40 within writer core structure 38. Insulating layer 54 fully conforms to conductive coil 40 and ensures equal coverage of coil turns 56 on all sides, regardless of pitch, by insulating layer 54. It is important that insulating layer 54 have complete coverage of conductive coil 40. Coverage of the sidewalls of core 50 formed by shared pole extension 34 and back via 36, by insulating layer 54 is permissible as long as coil 40 is fully isolated from core fill material 44. Thermal contact between core fill material 44, shared pole extension 34 and back via 36 is improved by application of a photoresist mask and wet-etch steps to remove insulating layer 54 from those surfaces.

Figure 7:
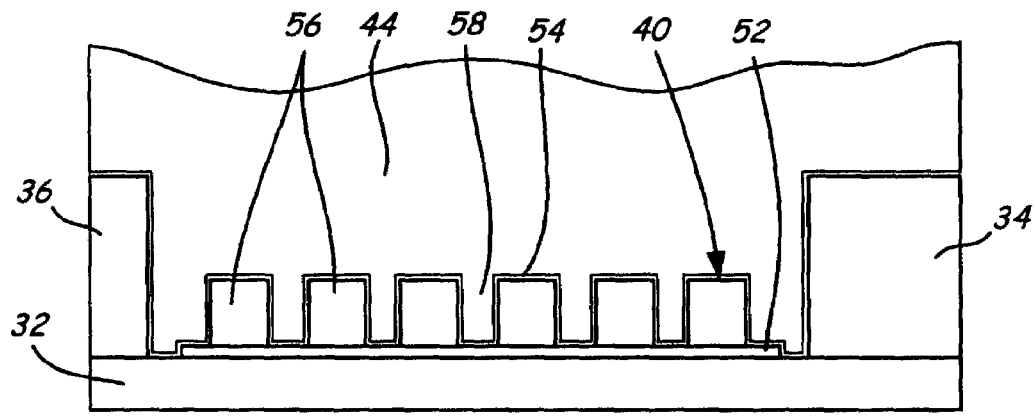

As shown in FIG. 7, core 50 is filled with high-thermal conductivity core fill material 44. Since conductive coil 40 is encapsulated by dielectric ALD material 42, core fill material 44 can be insulating, semi-conducting, or conducting (i.e. metallic). The use of high-thermal conductivity core fill material 44 has two advantages. First, core fill material 44 allows materials with higher thermal conductivities than conventional oxides to be placed between coil turns 56 to act as cooling fins. Second, core fill material 44 relaxes processing constraints since a variety of processes, including collimated sputtering, conventional sputtering, conventional CVD, metallic organic CVD (MOCVD), high density plasma CVD (HDP-CVD), or electroplating can be used in the coil fill step. In the case of plating or MOCVD, a highly conformal metal seed layer may be deposited on insulating layer 54 by ALD as well. Known metal ALD processes include W, Ta, Ti, Cu, Ni, with available precursors for Co, Fe, Al, and Cr.

Since CPTR is a function of ΔT and CTE of core fill 44, core fill material 44 must have a higher thermal conductivity than typical core fill material $Al_2O_3$, and a lower coefficient of thermal expansion than $Al_2O_3$. The thermal conductivity of core fill material 44 is greater than 1.5 W-m/K and the coefficient of thermal expansion of core fill material 44 is less than $6.0 \times 10^{-6}/°$ C. Examples of suitable core fill materials include, but are not limited to, SiC, AlN, Poly-Si, W, and Mo.

An additional advantage of the present invention is the ability to widen coil turns 56 of conductive coil 40 to an aspect ratio limit which can be handled by seed mill and core fill processes. The wider aspect ratio permits a drop in the coil current while maintaining constant flux delivery to writer 18, thus reducing the total amount of joule heating being transferred to writer core structure 38. For example, the trenches between coil turns 56 may have an aspect ratio limit of 4:1 or 5:1.

Figure 8:
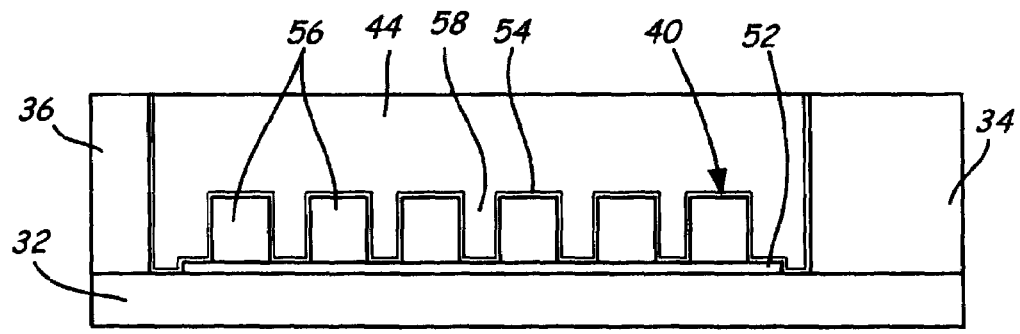

As shown in FIG. 8, the writer core structure is planed to a finished height by a chemical mechanical planarization (CMP) process.

Figure 9:
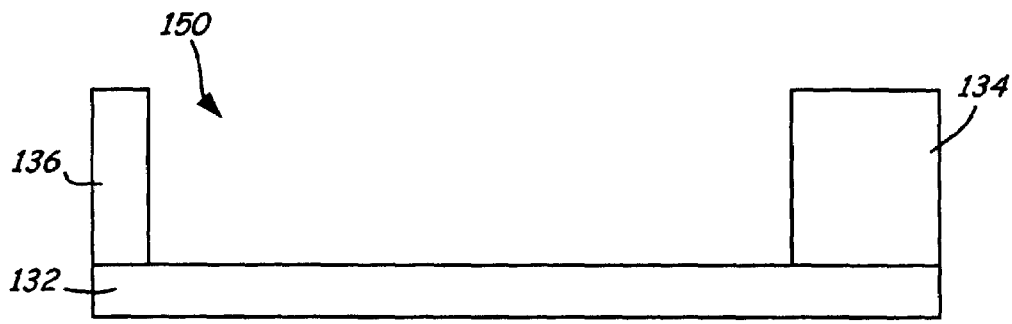
FIGS. 9 through 16 are sectional views of the transducing head illustrating various stages of another embodiment of the process flow for fabricating the writer core structure.

FIGS. 9–16 are sectional views of a transducing head illustrating various stages of another embodiment of the process flow for fabricating a writer core structure 138, in particular building writer core structure 138 having a damascene coil structure (like structure discussed with respect to FIGS. 1–8 are referred to by numerals throughout FIGS. 9–16). As shown in FIG. 9, a shared pole extension 134 and a back via 136 are patterned and formed upon a bottom pole 132. Shared pole extension 134 and back via 132 are collectively identified as an upper shared pole. Bottom pole 132, shared pole extension 134, and back via 134 define a core 150 for building writer core structure 138.

Figure 10:
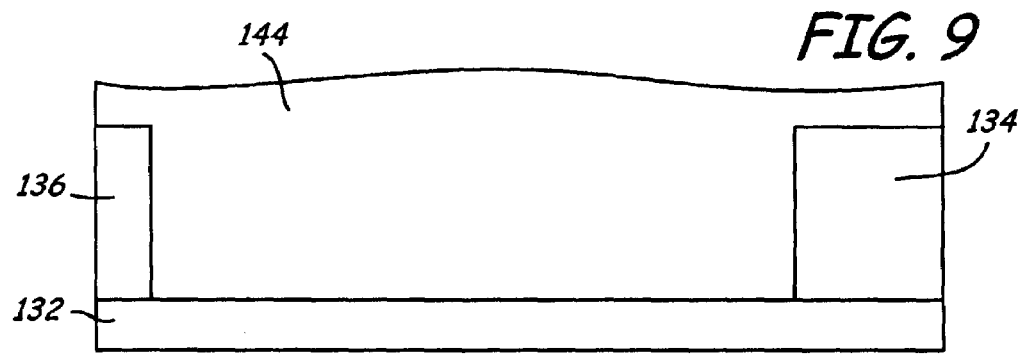

As shown in FIG. 10, core 150 is filled with a high-thermal conductivity core fill material 144. Core fill material 144 can be insulating, semi-conducting, or conducting (i.e. metallic). In addition, core fill material 144 has a thermal conductivity greater than 1.5 W-m/K and a coefficient of thermal expansion less than $6.0 \times 10^{-6}/°$ C. Examples of core fill materials include SiC, AlN, poly-Si, W, and Mo.

Figure 11:
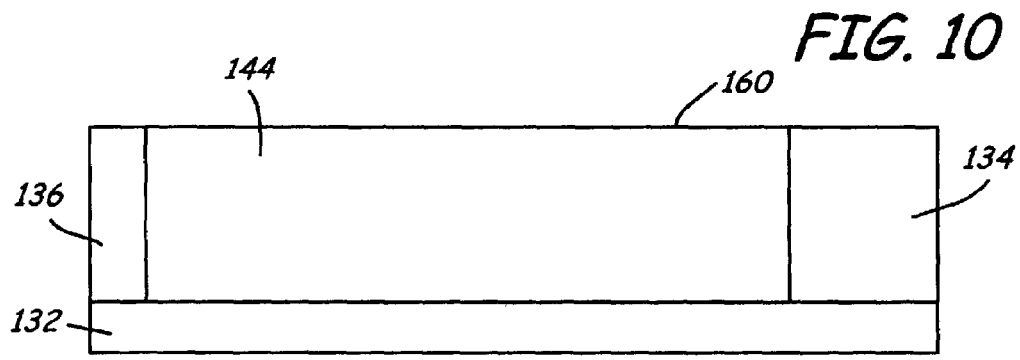

As shown in FIG. 11, core 150 and core fill 144 are planed to a first surface 160 by a CMP process. Thus, core fill material 144 does not cover top surfaces of shared pole extension 134 or back via 136.

Figure 12:
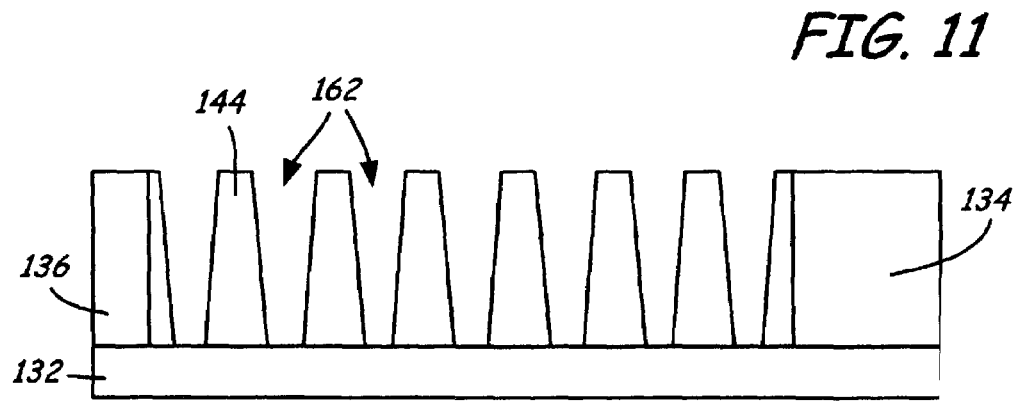

As shown in FIG. 12, core fill material 144 is coil mask patterned and etched to form coil trenches 162. Core fill material 144 is patterned and etched using reactive ion etching (RIE) or inductively-coupled plasma (ICP). Patterning coil trenches 162 into core fill material 144 is done by patterning a coil mask on top of core fill material 144 and etching core fill material 144 to form coil trenches 162. Endpointing is accomplished using either time or selective chemistry to stop at bottom pole 132. Depending upon which core fill material is used in writer core structure 138, a specific etchant is used. The following table identifies example etch chemistry which may be used for a respective core fill material.

| Core Fill Material | Etch Chemistry |
| --- | --- |
| SiC | $SF_6$; $CF_4 + O_2$ |
| AlN | $BCl_3$; $Ar + Cl_2$; $CH_4 + H_2 + Ar$ |
| Poly-Si | $Cl_2 + SF_6$ |
| W | $SF_6$; $CF_4 + O_2$ |
| Mo | $CF_4$; $Cl_2 + O_2$ |

Figure 13:
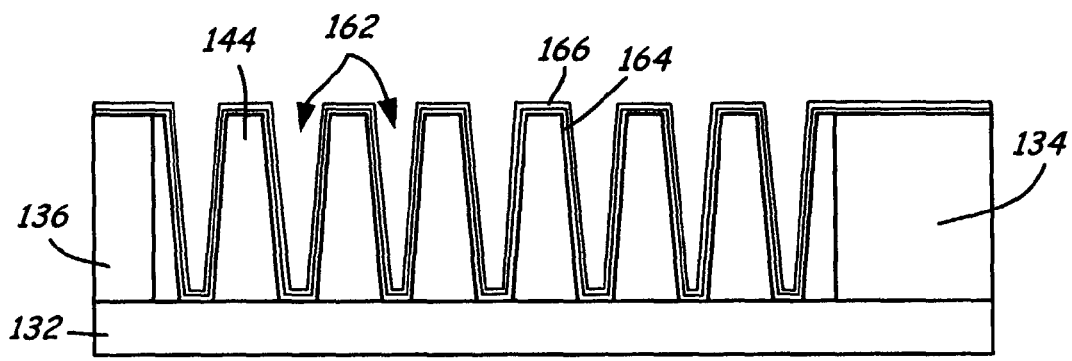

As shown in FIG. 13, an insulating layer 164 is deposited upon exposed surfaces of core 150, in particular, insulating layer 164 encapsulates sidewalls of coil trenches 162 and top surfaces of core fill material 144, shared pole extension 134, and back via 136. Insulating layer 164 is preferably deposited using an ALD process. Insulating layer 164 is comprised of a dielectric material, and in particular a material which can be used in the ALD process, such as $Al_2O_3$, $Ta_2O_5$, $HfO_2$, $TiO_2$, $ZrO_2$, CuO, $Nb_2O_5$, $SiO_2$, $In_2O_3$, MgO, TiN, TaN, MoN, NbN, SiN, AlN, WN, $W_2N$, and BN. Insulating layer 164 has a thickness between about 200 angstroms to about 500 angstroms. A coil seed layer 166 is deposited upon insulating layer 164 by collimated PCD, ionized PVD, CVD, MOCVD, or ALD. Coil seed layer 166 is used for forming conductive coil 140.

Figure 14:
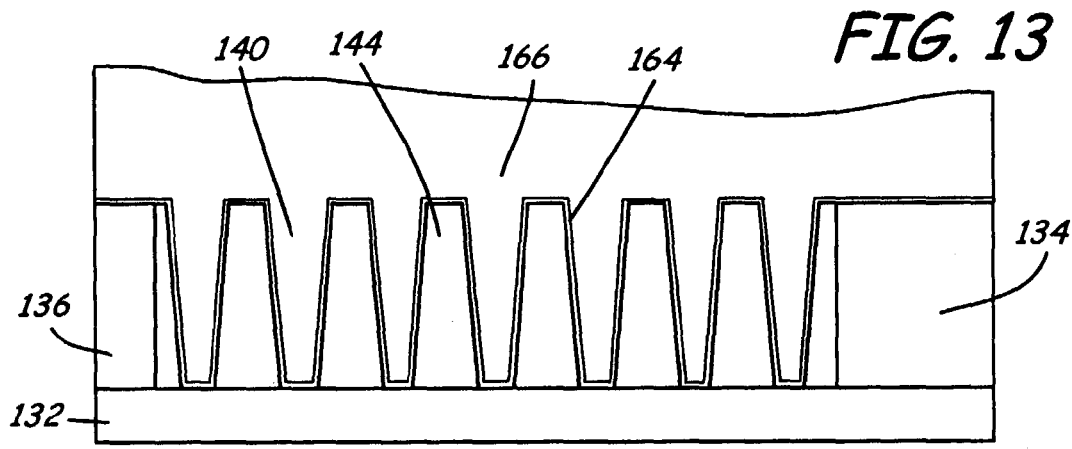

As shown in FIG. 14, conductive coil 140 is deposited by MOCVD or electroplating to fill coil trenches 162.

Figure 15:
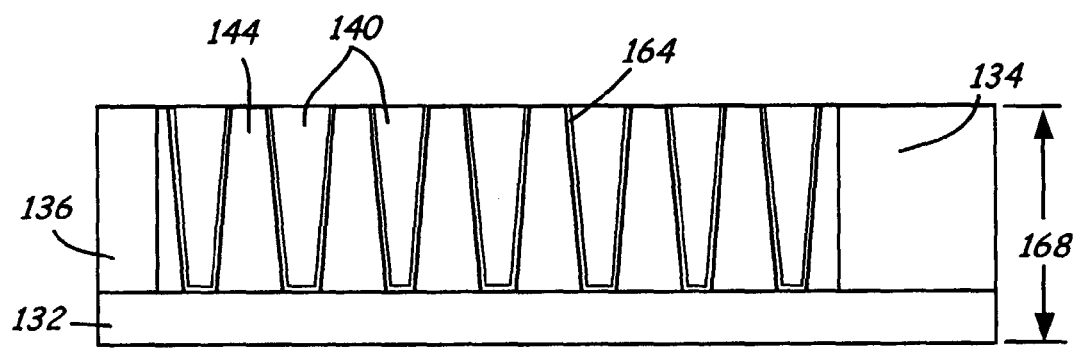

As shown in FIG. 15, writer core structure 138 is planarized to a finished height 168 by a CMP process.

Figure 16:
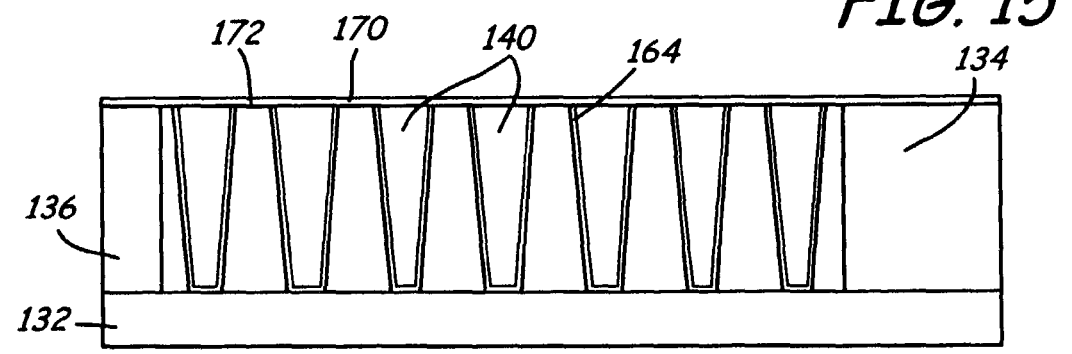

As shown in FIG. 16, a top insulator 170 is deposited upon a top surface 172 of writer core structure 138 to isolate conductive coil 140 from a top pole (not shown), which is formed upon top insulator 170. Top insulator 170 can be any dielectric material, but is preferably one with high thermal conductivity to maximize heat transfer to the top pole. When longitudinal writers are formed, top insulator 170 is sufficiently thick to protect against penetration of a notch mill into writer core structure 138. Examples of material that may be used to form top insulator 170 include $Al_2O_3$, $Ta_2O_5$, $HfO_2$, $TiO_2$, $ZrO_2$, CuO, $Nb_2O_5$, $SiO_2$, $In_2O_3$, MgO, TiN, TaN, MoN, NbN, SiN, AlN, WN, $W_2N$, and BN.

The present invention reduces current induced recession/protrusion at the pole tip (CPTR). A writer core structure with improved thermal dissipation is used. The writer core structure includes a conductive coil positioned in the core. The conductive coil is encapsulated by a thin layer of dielectric material deposited by an atomic layer deposition (ALD) technique. The remainder of the core is filled with a core fill material having a high thermal conductivity, which can be either insulating, semi-conducting, or conducting. The high thermal conductivity core fill material enables and improves thermal dissipation from the writer core structure and thereby reduces CPTR of the transducing head. Reducing CPTR reduces the risk of head-disc contact and mechanical reliability problems in the transducing head, in particular by maintaining the head-to-media spacing between the transducing head and the recording medium.

Although the present invention has been described with reference to preferred embodiments, workers skilled in the art will recognize that changes may be made in form and detail without departing from the spirit and scope of the invention.

What is claimed is:

1. A data transducer for writing data to a disc, the data transducer having an air bearing surface, the data transducer comprising:
    a bottom pole;
    a top pole separated from the bottom pole at the air bearing surface by a write gap wherein a core is formed between the bottom pole and the top pole;
    a conductive coil positioned within the core;
    an insulator conformed to turns of the conductive coil; and
    a core fill deposited within the core wherein the core fill is a high-thermal conductivity material that fills the core entirely, and wherein the insulator and core fill dissipate thermal energy away from the conductive coil.

2. The data transducer of claim 1 wherein a thermal conductivity of the core fill is greater than about 1.5 W/m-K.

3. The data transducer of claim 1 wherein the core fill is selected from a group consisting of SiC, AlN, Poly-Si, W, and Mo.

4. The data transducer of claim 1 wherein the core fill is insulating, semiconducting, or conducting.

5. The data transducer of claim 1 wherein the insulator is selected from a group consisting of $Al_2O_3$, $Ta_2O_5$, $HfO_2$, $TiO_2$, $ZrO_2$, CuO, $Nb_2O_5$, $SiO_2$, $In_2O_3$, MgO, TiN, TaN, MoN, NbN, SiN, AlN, WN, $W_2N$, and BN.

6. A data transducer for writing data to a disc and characterized by a bottom pole, an upper shared pole, a top pole wherein the bottom pole, upper shared pole and top pole define a core, and a thermally dissipative writer core structure formed within the core, the writer core structure comprising:
    a first insulator deposited on the bottom pole;
    a conductive coil patterned upon the first insulator;
    a second insulator encapsulating the coil; and
    a core fill deposited into the core wherein the core fill is a highly conductive material that fills the core entirely.

7. The writer core structure of claim 6 wherein the first insulator has a thickness of about 0.3 microns.

8. The writer core structure of claim 6 wherein the first insulator and the second insulator are selected from a group consisting of $Al_2O_3$, $Ta_2O_5$, $HfO_2$, $TiO_2$, $ZrO_2$, CuO, $Nb_2O_5$, $SiO_2$, $In_2O_3$, MgO, TiN, TaN, MoN, NbN, SiN, AlN, WN, $W_2N$, and BN.

9. The writer core structure of claim 6 wherein the second insulator has a thickness between about 200 angstroms and about 1000 angstroms.

10. The writer core structure of claim 6 wherein the core fill is selected from a group consisting of SiC, AlN, Poly-Si, W, and Mo.

11. The writer core structure of claim 6 wherein the core fill has a thermal conductivity greater than about 1.5 W/m-K.

12. The writer core structure of claim 6 wherein the core fill has a coefficient of thermal expansion less than $6.0 \times 10^{-6}/°C$.

13. A data transducer for writing data to a disc and characterized by a bottom pole, an upper shared pole, a top pole wherein the bottom pole, upper shared pole and top pole define a core, and a thermally dissipative writer core structure formed within the core, the writer core structure comprising:
    a core fill deposited into the core wherein the core fill is a highly conductive material that fills the core entirely;
    coil trenches patterned into the core material;
    a first insulator conformed to sidewalls of the coil trenches;
    a conductive coil patterned within the coil trenches wherein the first insulator separates the coil from the core fill; and
    a top insulator deposited on a top surface of the coil.

14. The writer core structure of claim 13 wherein the core fill is selected from a group consisting of SiC, AlN, Poly-Si, W, and Mo.

15. The writer core structure of claim 13 wherein the core fill has a thermal conductivity greater than about 1.5 W/m-K.

16. The writer core structure of claim 13 wherein the core fill has a coefficient of thermal expansion less than $6.0 \times 10^{-6}/°C$.

17. The writer core structure of claim 13 wherein the first insulator and the top insulator are selected from a group consisting of $Al_2O_3$, $Ta_2O_5$, $HfO_2$, $TiO_2$, $ZrO_2$, CuO, $Nb_2O_5$, $SiO_2$, $In_2O_3$, MgO, TiN, TaN, MoN, NbN, SiN, AlN, WN, $W_2N$, and BN.

* * * * *

UNITED STATES PATENT AND TRADEMARK OFFICE
CERTIFICATE OF CORRECTION

PATENT NO. : 6,989,963 B2
APPLICATION NO. : 10/421538
DATED : January 24, 2006
INVENTOR(S) : Michael Christopher Kautzky et al.

It is certified that error appears in the above-identified patent and that said Letters Patent is hereby corrected as shown below:

Title Page, item [75] Column 1, Line 8, delete "Eden Praire", insert --Eden Prairie--

Signed and Sealed this

Twenty-sixth Day of December, 2006

JON W. DUDAS
*Director of the United States Patent and Trademark Office*